US012748465B2

(12) United States Patent
Niu et al.

(10) Patent No.: US 12,748,465 B2
(45) Date of Patent: Sep. 29, 2026

(54) FOLDING MECHANISM AND ELECTRONIC DEVICE

(71) Applicant: VIVO MOBILE COMMUNICATION CO., LTD., Guangdong (CN)

(72) Inventors: Zhihao Niu, Guangdong (CN); Zongwen He, Guangdong (CN); Ximing Liu, Guangdong (CN); Zhengjun Luo, Guangdong (CN); Dongcun Cheng, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 313 days.

(21) Appl. No.: 18/533,253

(22) Filed: Dec. 8, 2023

(65) Prior Publication Data

US 2024/0111340 A1 Apr. 4, 2024

Related U.S. Application Data

(63) Continuation of application No. PCT/CN2022/097298, filed on Jun. 7, 2022.

(30) Foreign Application Priority Data

Jun. 11, 2021 (CN) ......................... 202110652306.5

(51) Int. Cl.
*G06F 1/16* (2006.01)
*G09F 9/30* (2006.01)

(52) U.S. Cl.
CPC ............ *G06F 1/1681* (2013.01); *G09F 9/301* (2013.01)

(58) Field of Classification Search
None
See application file for complete search history.

(56) References Cited

U.S. PATENT DOCUMENTS 11,224,137 B2 * 1/2022 Hsu ..................... E05D 11/0081
2021/0044682 A1 2/2021 Liu et al.
(Continued)

FOREIGN PATENT DOCUMENTS

CN 108322567 A 7/2018
CN 208421695 U 1/2019
(Continued)

OTHER PUBLICATIONS

First Office Action for Chinese Application No. 202110652306.5, dated Dec. 11, 2023, 8 Pages.
(Continued)

*Primary Examiner* — Imani N Hayman
*Assistant Examiner* — Rashen E Morrison
(74) *Attorney, Agent, or Firm* — BROOKS KUSHMAN P.C.

(57) ABSTRACT

In a folding mechanism, a first housing seat is rotatably disposed on a first screen support plate, a second housing seat is rotatably disposed on a second screen support plate, and a third screen support plate is movably connected to a base in a support direction of the third screen support plate; the first housing seat is rotatably connected to the base via a first swing arm, the second housing seat is rotatably connected to the base via a second swing arm, the first screen support plate is slidably and rotatably connected to the base via a third swing arm, the second screen support plate is slidably and rotatably connected to the base via a fourth swing arm, a rotation axis of the first swing arm is spaced apart from that of the third swing arm.

18 Claims, 6 Drawing Sheets

(56) References Cited

U.S. PATENT DOCUMENTS

| | | | | |
|---|---|---|---|---|
| 2021/0165466 | A1* | 6/2021 | Kang | G06F 1/1681 |
| 2021/0247815 | A1* | 8/2021 | Shim | G06F 1/1641 |
| 2021/0271294 | A1* | 9/2021 | Liao | G06F 1/181 |
| 2021/0368032 | A1* | 11/2021 | Liao | G06F 1/1681 |
| 2022/0217228 | A1 | 7/2022 | Hu et al. | |
| 2022/0303371 | A1* | 9/2022 | Liao | H04M 1/0268 |
| 2022/0308634 | A1* | 9/2022 | Hou | G06F 1/1641 |
| 2023/0075646 | A1* | 3/2023 | Niu | H04M 1/0268 |

FOREIGN PATENT DOCUMENTS

| | | | |
|---|---|---|---|
| CN | 109637377 | A | 4/2019 |
| CN | 109658826 | A | 4/2019 |
| CN | 110417964 | A | 11/2019 |
| CN | 110784570 | A | 2/2020 |
| CN | 111583791 | A | 8/2020 |
| CN | 111614806 | A | 9/2020 |
| CN | 111698355 | A | 9/2020 |
| CN | 112081815 | A | 12/2020 |
| CN | 112751961 | A | 5/2021 |
| CN | 112901643 | A | 6/2021 |
| CN | 113315860 | A | 8/2021 |

OTHER PUBLICATIONS

Second Office Action for Chinese Application No. 202110652306.5, dated May 17, 2024, 8 Pages.

International Search Report and Written Opinion for Application No. PCT /CN2022/097298, dated Aug. 19, 2022, 7 Pages.

* cited by examiner

FOLDING MECHANISM AND ELECTRONIC DEVICE

CROSS-REFERENCE TO RELATED APPLICATIONS

This application is a continuation of International Application No. PCT/CN2022/097298, filed on Jun. 7, 2022, which claims priority to Chinese Patent Application No. 202110652306.5, filed on Jun. 11, 2021, which are incorporated herein by reference in their entireties.

TECHNICAL FIELD

This application pertains to the technical field of communication devices, and specifically relates to a folding mechanism and an electronic device.

BACKGROUND

As various advanced technologies are applied to electronic devices, an update speed of the electronic devices becomes faster, and a user imposes a higher requirement on the electronic devices. Taking a flexible screen as an example, a foldable electronic device rapidly develops, and therefore the electronic device has a large display area and better portability performance.

However, in a use process of the foldable electronic device, an excessive bending phenomenon occurs because a bending part of the flexible screen is prone to be squeezed, and a service life of the flexible screen is adversely affected.

SUMMARY

According to a first aspect, an embodiment of this application discloses a folding mechanism, including a base, a first housing seat, a second housing seat, a first screen support plate, a second screen support plate, and a third screen support plate, where the first housing seat is rotatably disposed on the first screen support plate, the first housing seat and the first screen support plate are disposed on a first side of the base, the second housing seat is rotatably disposed on the second screen support plate, the second housing seat and the second screen support plate are disposed on a second side of the base, the first side and the second side are disposed opposite to each other, and the third screen support plate is movably connected to the base in a support direction of the third screen support plate;

the folding mechanism further includes a swing arm assembly and a cover, where the swing arm assembly includes a first swing arm, a second swing arm, a third swing arm, and a fourth swing arm, the first swing arm and the third swing arm are disposed on a same side as the first housing seat, and the second swing arm and the fourth swing arm are disposed on a same side as the second housing seat;

a first end of the first swing arm is rotatably connected to the base, a second end of the first swing arm is rotatably connected to the first housing seat, a first end of the third swing arm is rotatably connected to the base, a second end of the third swing arm is slidably fitted into the first housing seat, the second end of the third swing arm and the first screen support plate can slide relatively and are rotatably fitted, and a rotation axis of the first end of the first swing arm is spaced apart from a rotation axis of the first end of the third swing arm;

a first end of the second swing arm is rotatably connected to the base, a second end of the second swing arm is rotatably connected to the second housing seat, a first end of the fourth swing arm is rotatably connected to the base, a second end of the fourth swing arm is slidably fitted into the second housing seat, the second end of the fourth swing arm and the second screen support plate can slide relatively and are rotatably fitted, and a rotation axis of the first end of the second swing arm is spaced apart from a rotation axis of the first end of the fourth swing arm; and the cover is mounted on the base, and the cover is disposed on one side that is of the base and that faces away from the third screen support plate; and the folding mechanism has an expanded state and a folded state, where in the expanded state, respective screen support surfaces of the first screen support plate, the second screen support plate, and the third screen support plate are coplanar, there is a first spacing between a part that is of the base and that faces the third screen support plate and the third screen support plate in the support direction, and the cover covers the first end of the first swing arm; and in the folded state, there is a second spacing between the part that is of the base and that faces the third screen support plate and the third screen support plate in the support direction, and the second spacing is less than the first spacing.

According to a second aspect, an embodiment of this application discloses an electronic device, including a flexible screen, a first housing, a second housing, and the folding mechanism, where the first housing is fixedly connected to the first housing seat, the second housing is fixedly connected to the second housing seat, and the flexible screen is disposed on the first housing, the second housing, the first screen support plate, the second screen support plate, and the third screen support plate.

BRIEF DESCRIPTION OF DRAWINGS

The accompanying drawings described herein are intended to provide a further understanding of the present application, and constitute a part of the present application. The illustrative embodiments of the present application and descriptions thereof are intended to describe the present application, and do not constitute limitations on the present application. In the accompanying drawings.

REFERENCE NUMERALS

Figure 1:
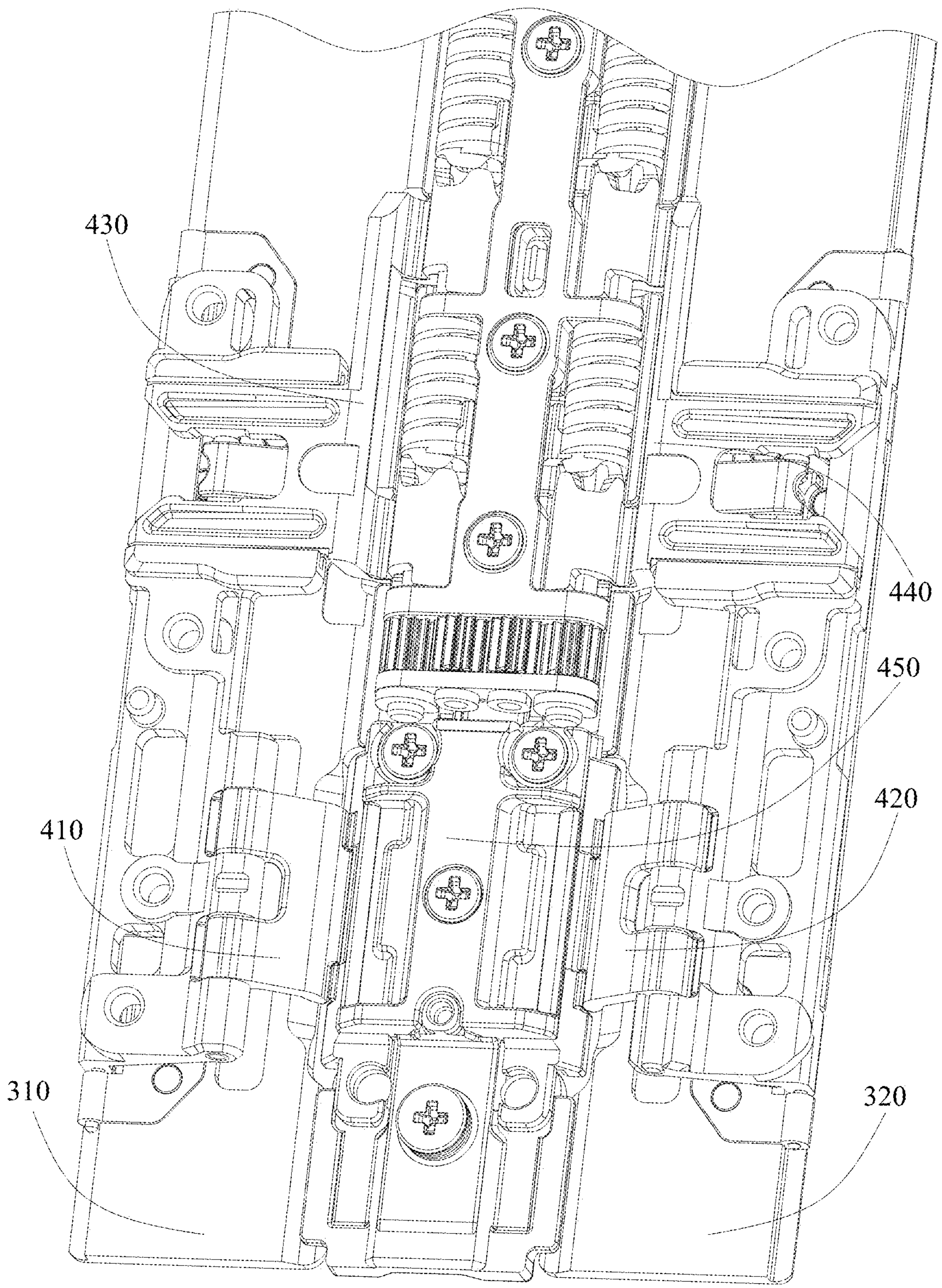
FIG. 1 is a schematic diagram of a partial structure of a folding mechanism according to an embodiment of this application.
Figure 2:
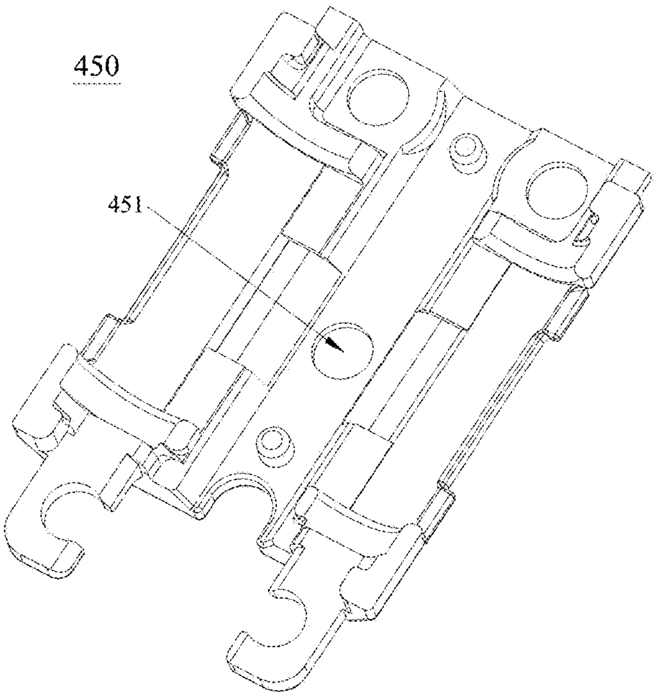
FIG. 2 is a schematic structural diagram of a cover in a folding mechanism according to an embodiment of this application.

100—Base; 110—Third rotating portion; 120—Fourth rotating portion; 130—Accommodating groove; 140—Guide hole;

210—First housing seat; 211—Sliding slot; 212—Avoidance hole; 220—Second housing seat; 310—First screen support plate; 320—Second screen support plate; 330—Third screen support plate; 340—Elastic reset member; 350—Threaded connecting piece; 360—Guide post; 410—First swing arm; 411—Avoidance notch; 420—Second swing arm; 430—Third swing arm; 440—Fourth swing arm; 450—Cover; 451—Perforation;

510—Rail body; 520—Sliding member;

610—First connecting shaft; 620—Second connecting shaft; 631—First gear; 632—Second gear; 633—First engaging tooth; 634—Second engaging tooth; 640—Gear bracket; 651—First cam sleeve; 652—Second cam sleeve; 653—Connecting rod; 660—Elastic member; 671—First limiting member; 672—Second limiting member; 673—Mounting member; 674—Clamp spring.

DETAILED DESCRIPTION

The following clearly and completely describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

In the specification and claims of this application, the terms "first", "second", and the like are intended to distinguish between similar objects but do not describe a specific order or sequence. It should be understood that, data used in such a way are interchangeable in proper circumstances, so that the embodiments of this application can be implemented in an order other than the order illustrated or described herein. Objects classified by "first", "second", and the like are usually of a same type, and the number of objects is not limited. For example, there may be one or more first objects. In addition, in the specification and the claims, "and/or" represents at least one of connected objects, and a character "/" generally represents an "or" relationship between associated objects.

With reference to the accompanying drawings, a folding mechanism and an electronic device provided in the embodiments of this application are described in detail by using specific embodiments and application scenes.

As shown in FIG. 1 to FIG. 10, an embodiment of this application discloses a folding mechanism. The folding mechanism may be applied to an electronic device, and a flexible screen is fitted into the folding mechanism to form an electronic device with a folding capability. The electronic device has a large display area and a better portability capability, thereby improving user experience.

The folding mechanism includes a base 100, a first housing seat 210, a second housing seat 220, a first screen support plate 310, a second screen support plate 320, and a third screen support plate 330, where the first housing seat 210 is disposed on the first screen support plate 310, and the second housing seat 220 is disposed on the second screen support plate 320. In addition, the folding mechanism further includes a swing arm assembly, and the first housing seat 210 and the second housing seat 220 are movably mounted on the base 100 via the swing arm assembly, so that the first screen support plate 310, the second screen support plate 320, the first housing seat 210, and the second housing seat 220 form an integral body with the base 100. In addition, the first housing seat 210 is rotatably fitted into the first screen support plate 310, and the second housing seat 220 is rotatably fitted into the second screen support plate 320, so that in a case that the first housing seat 210 and the second housing seat 220 rotate relative to each other, a relative rotation angle between the first screen support plate 310 and the second support plate can exceed 180°. Therefore, when the folding mechanism switches to a folded state, the first screen support plate 310 and the second screen support plate 320 can form a flaring structure, thereby providing more accommodating space for a middle part of the flexible screen, that is, a folded part of the flexible screen. In addition, the third screen support plate 330 moves relative to the base 100, so that when the electronic device including the folding mechanism is folded, the third screen support plate 330 can provide avoidance space for the flexible screen, to further expand the accommodating space of the middle part of the flexible screen, thereby preventing the flexible screen from being overfolded, resulting in damage to the flexible screen.

As described above, the first housing seat 210 is disposed on the first screen support plate 310, the second housing seat 220 is disposed on the second screen support plate 320, the first housing seat 210 and the first screen support plate 310 are disposed on a first side of the base 100, the second housing seat 220 and the second screen support plate 320 are disposed on a second side of the base 100, and the first side and the second side are disposed opposite to each other. Specifically, the base 100, the first housing seat 210, the second housing seat 220, the first screen support plate 310, and the second screen support plate 320 may all be made of a material with strong structural strength such as metal or plastic, to ensure a relatively stable connection and engaging relationship between the components, and provide a reliable support effect for the flexible screen.

Specifically, parameters such as structures and sizes of the first housing seat 210 and the second housing seat 220 may be different, and may be flexibly designed according to another component such as the flexible screen of the electronic device. Optionally, the structures of the first housing seat 210 and the second housing seat 220 are symmetrically designed, and corresponding sizes thereof are the same, to facilitate processing and assembling of the entire folding mechanism. Similarly, respective sizes of the first screen support plate 310 and the second screen support plate 320 may be determined according to parameters such as an area of the flexible screen that needs to be supported. Optionally, both the first screen support plate 310 and the second screen support plate 320 may be of a rectangular or approximately rectangular structure, to improve a support effect on the flexible screen. Further, structures of the first screen support plate 310 and the second screen support plate 320 may be symmetrically disposed to reduce difficulty in processing and assembling the entire folding mechanism.

For ease of description, the following are based on symmetrical disposing of the first housing seat 210 and the second housing seat 220 and symmetrical disposing of the first screen support plate 310 and the second screen support plate 320, and a relationship between associated components is described by using the first housing seat 210 and the first screen support plate 310 as an example. For a relationship between the second housing seat 220 and the second screen support plate 320, refer to the corresponding design of the first housing seat 210 and the first screen support plate 310. Specifically, the first screen support plate 310 may be supported on the first housing seat 210, and a connection relationship may be formed between the two. For example, a rotational connection relationship may be formed between the two via a shaft, to ensure that the first screen support plate 310 can rotate relative to the first housing seat 210. Alternatively, the first screen support plate 310 and the first housing seat 210 may only support each other, and the first screen support plate 310 can rotate relative to the first housing seat 210 via the swing arm assembly.

As described above, the third screen support plate 330 is movably connected to the base 100 in a support direction of the third screen support plate 330. Specifically, a material of the third screen support plate 330 may be the same as that of the first screen support plate 310. The third screen support plate 330 may be connected to the base 100 via a limiting structure, so that the third screen support plate 330 can move relative to the base 100 only in the support direction of the third screen support plate 330 through a limiting function provided by the limiting structure.

Orientation setting of the flexible screen of the electronic device is used as an example. As for a motion driving source of the third screen support plate 330, optionally, in a process in which the third screen support plate 330 moves toward the base 100 or in a process in which the flexible screen is folded, the third screen support plate 330 may be driven to move downward through a squeezing function provided by the flexible screen that generates a deformation action, so as to move closer to the base 100. On the contrary, in a process in which the third screen support plate 330 moves away from the base 100 or in a process in which the flexible screen is expanded, the first housing seat 210 and/or the second housing seat 220 and the third screen support plate 330 may move toward one side of the base 100 for mutual limiting, and as the first housing seat 210 and/or the second housing seat 220 rotate relative to the base 100, the third screen support plate 330 is raised, so that the third screen support plate 330 moves further away from the base 100, to finally provide a support function for the flexible screen.

In another embodiment of this application, the third screen support plate 330 may be alternatively connected to the base 100 by using a component with a stretching capability such as a spring, so that the third screen support plate 330 can move relative to the base 100 in the support direction of the third screen support plate 330 in a process of switching a state of the folding mechanism. More specifically, a parameter such as a model of the selected spring is changed, so that different fitting relationships can be formed between the spring and the third screen support plate 330. For example, when the folding mechanism is in an expanded state and the third screen support plate 330 is flush with the first screen support plate 310, the spring may be in any one of a stretched state, a compressed state, and a natural state to meet different requirements.

Figure 3:
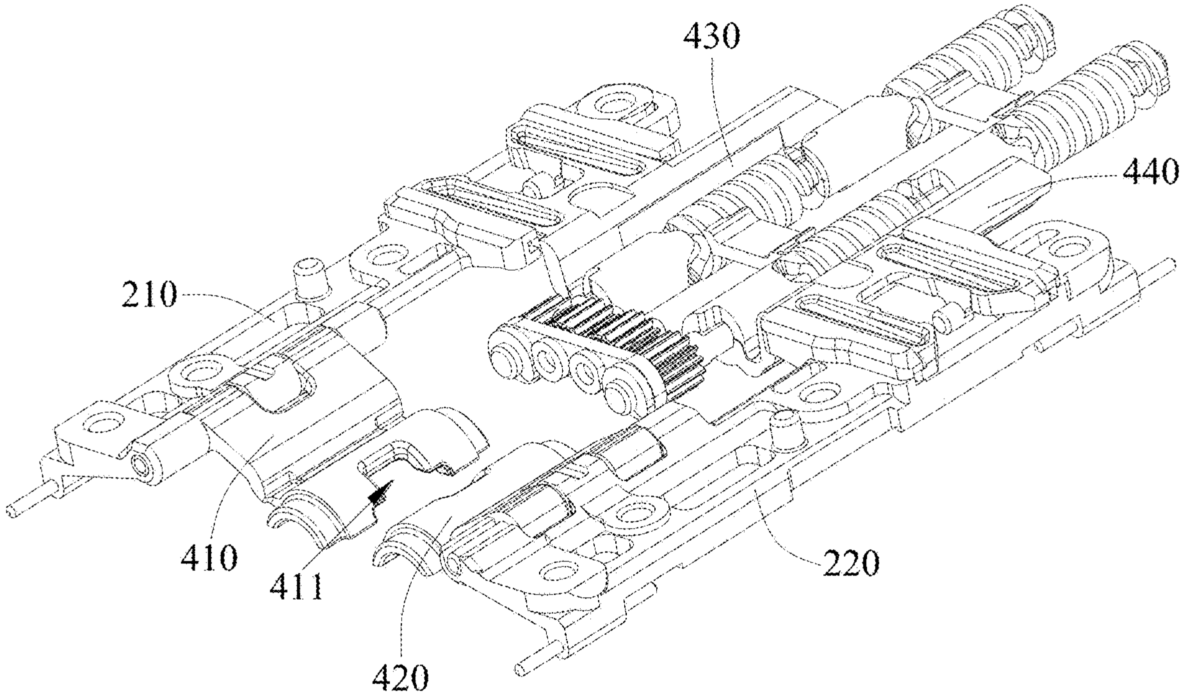
FIG. 3 is a schematic diagram of a partial structure including a swing arm assembly in a folding mechanism according to an embodiment of this application.
Figure 4:
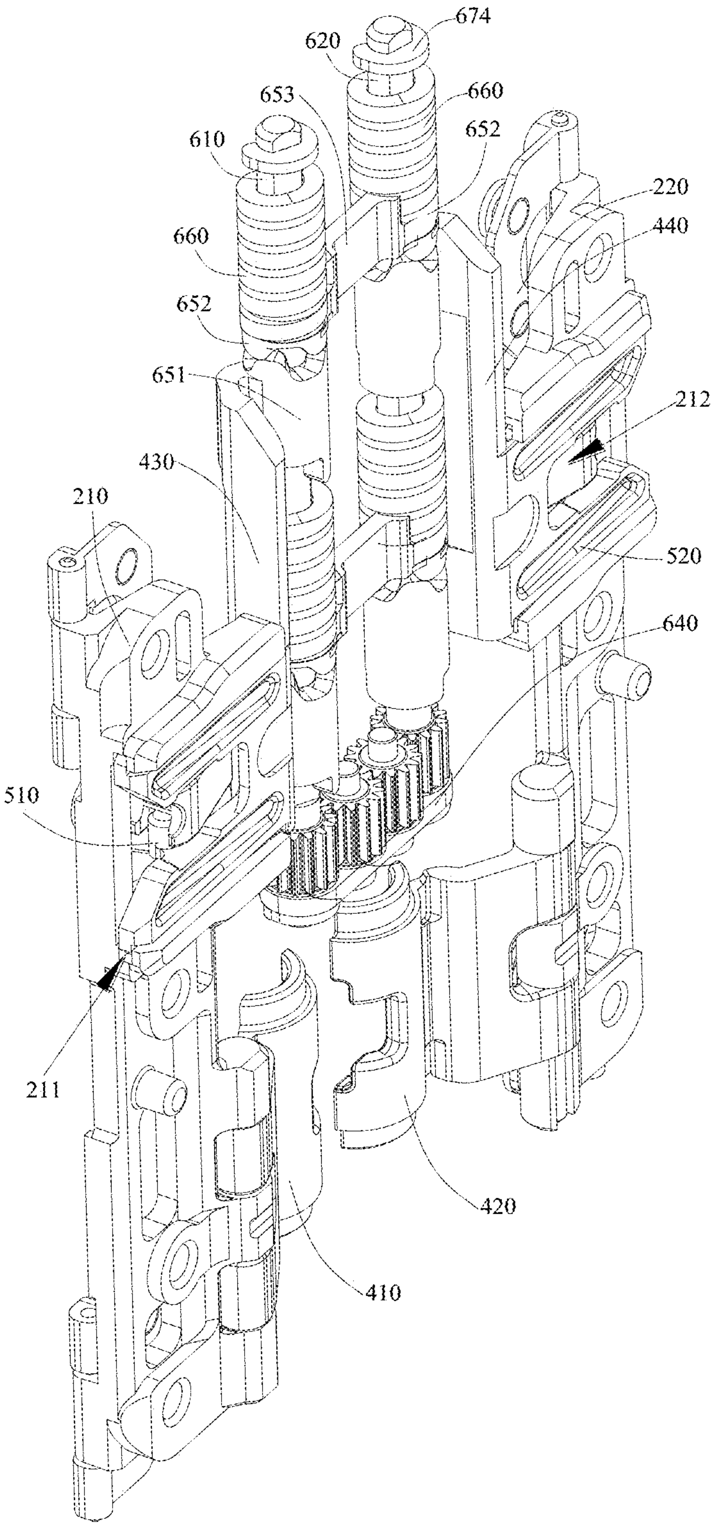
FIG. 4 is a schematic diagram of a partial structure including a swing arm assembly in a folding mechanism in another direction according to an embodiment of this application.
Figure 5:
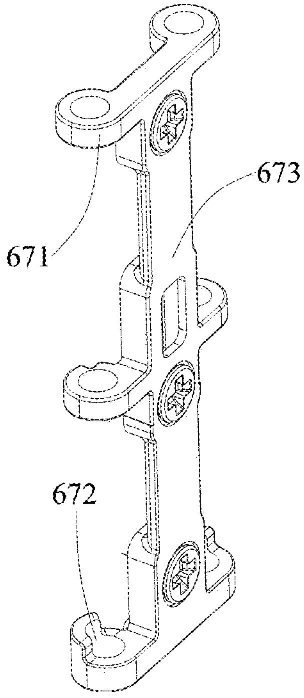
FIG. 5 is a schematic diagram of a partial structure including a mounting member in a folding mechanism according to an embodiment of this application.
Figure 6:
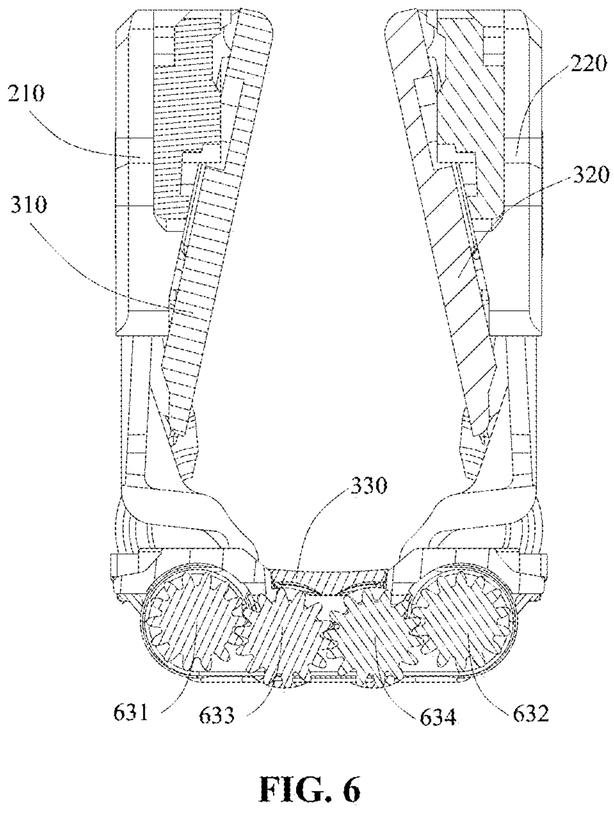
FIG. 6 is a schematic cross-sectional diagram of a partial structure of a folding mechanism according to an embodiment of this application.
Figure 7:
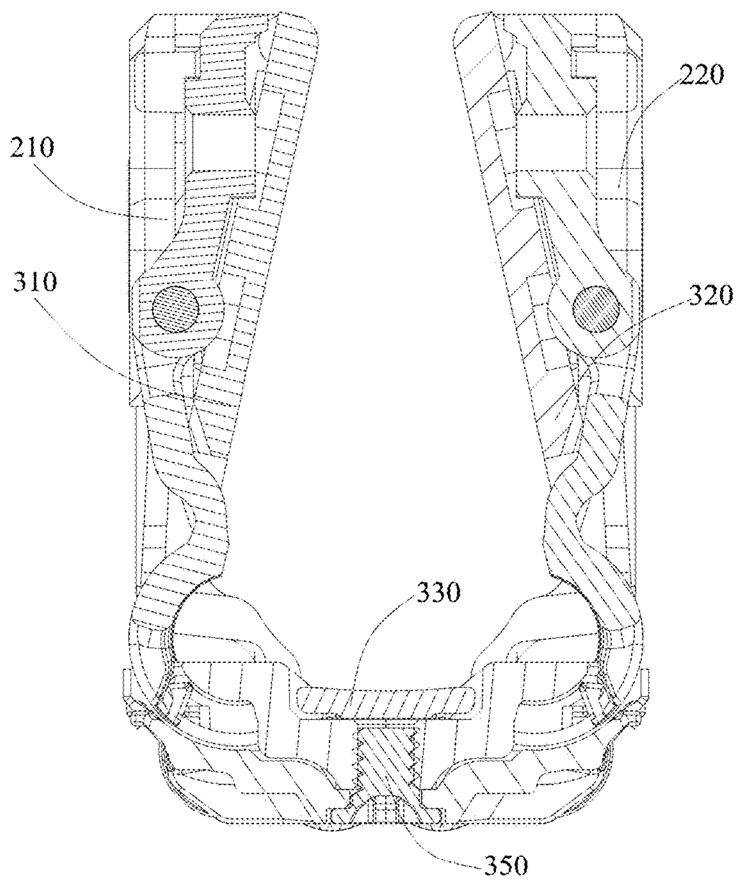
FIG. 7 is a schematic cross-sectional diagram of a partial structure of a folding mechanism in a folded state according to an embodiment of this application.
Figure 8:
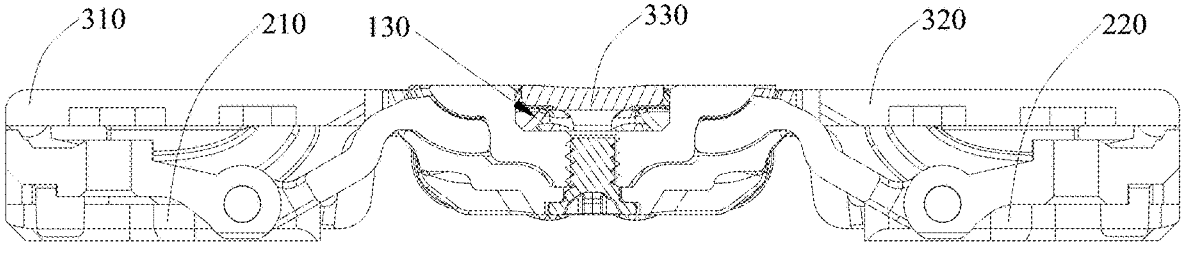
FIG. 8 is a schematic cross-sectional diagram of a partial structure of a folding mechanism in an expanded state according to an embodiment of this application.
Figure 9:
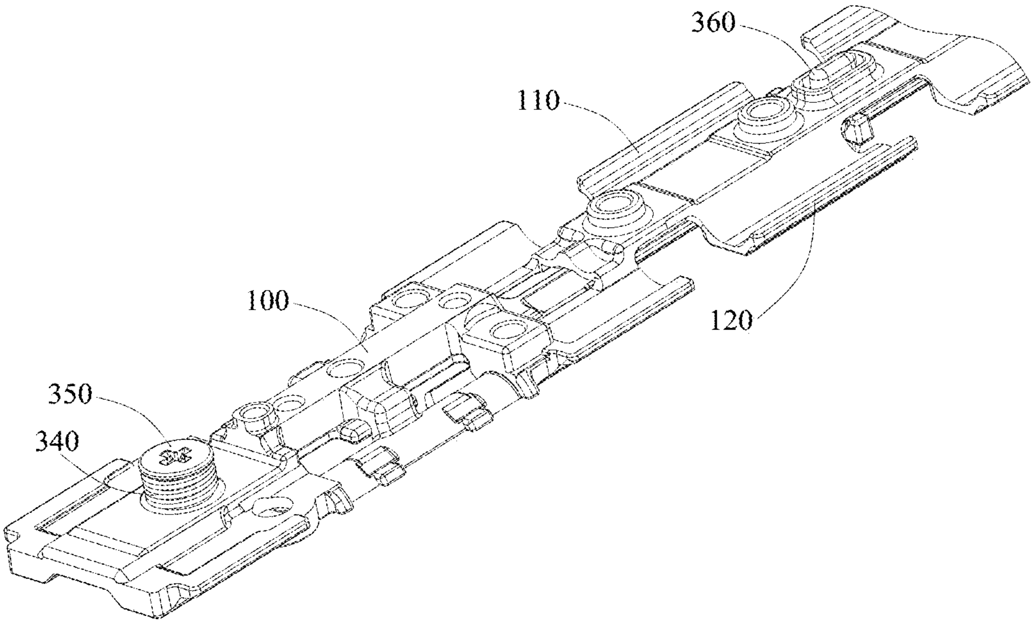
FIG. 9 is an assembly diagram of a partial structure including a base and a third screen support plate in a folding mechanism according to an embodiment of this application.
Figure 10:
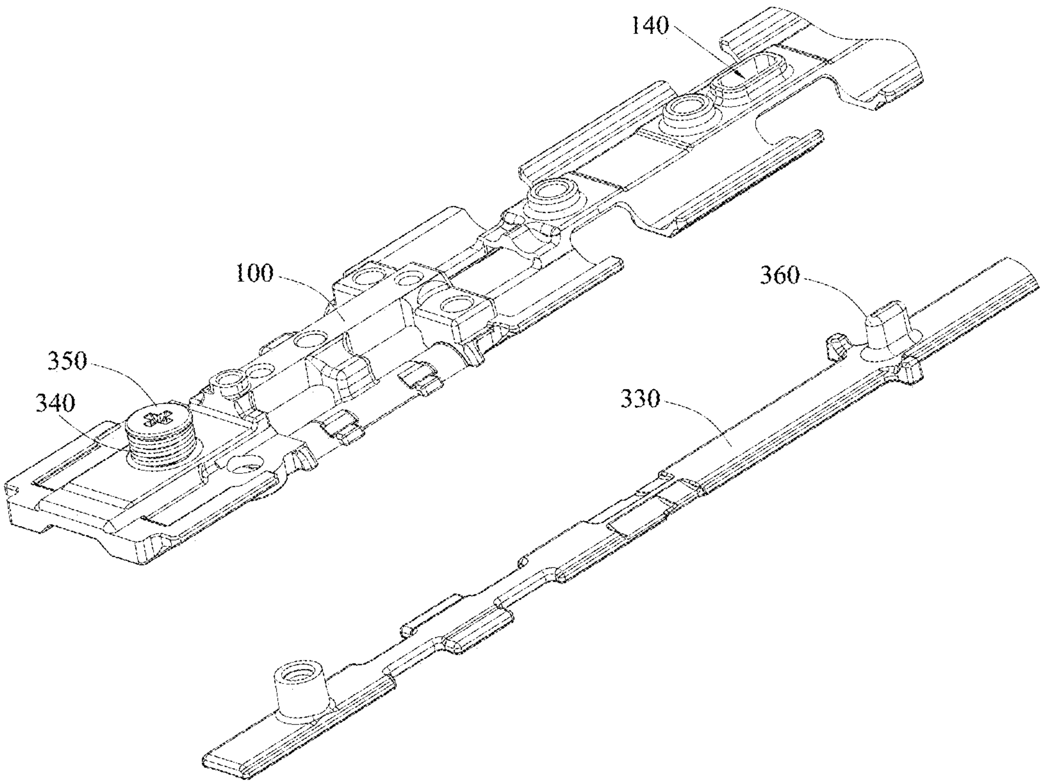
FIG. 10 is an exploded view of a partial structure including a base and a third screen support plate in a folding mechanism according to an embodiment of this application.

As shown in FIG. 3, the swing arm assembly includes a first swing arm 410, a second swing arm 420, a third swing arm 430, and a fourth swing arm 440, and the four may be made of a material with strong structural strength and wear resistance such as metal, to ensure that the swing arm assembly has a long service life and high reliability.

Both the first swing arm 410 and the third swing arm 430 are disposed on a same side as the first housing seat 210, that is, both the first swing arm 410, the third swing arm 430, and the first housing seat 210 are located on a first side of the base 100.

The second swing arm 420 and the fourth swing arm 440 are disposed on a same side as the second housing seat 220, that is, the second swing arm 420, the fourth swing arm 440, and the second housing seat 220 are all located on the second side of the base 100.

A first end of the first swing arm 410 is rotatably connected to the base 100, so that the first swing arm 410 can rotate around the base 100 via the first end of the first swing arm 410. A second end of the first swing arm 410 is rotatably connected to the first housing seat 210, so that the first swing arm 410 can rotate relative to the first housing seat 210 via the second end of the first swing arm 410. Specifically, rotational connection relationships may be respectively formed between the two opposite ends of the first swing arm 410 and the base 100 and the first housing seat 210 via a pin shaft structure, or rotational fitting relationships may be respectively formed between the two opposite ends of the first swing arm 410 and the base 100 and the first housing seat 210 via another arc-shaped fitting structure that is correspondingly disposed. For brevity, details are not described herein.

A first end of the third swing arm 430 is rotatably connected to the base 100, so that the third swing arm 430 can rotate around the base 100 via the first end of the third swing arm 430. A second end of the third swing arm 430 is slidably fitted into the first housing seat 210, so that there is a relative sliding capability between the second end of the third swing arm 430 and the first housing seat 210 in a rotation process of the third swing arm 430. Correspondingly, the second end of the third swing arm 430 and the first screen support plate 310 can slide relatively and are rotatably fitted, so that when the third swing arm 430 is assembled and connected to the first screen support plate 310, the first screen support plate 310 is driven to rotate relative to the first housing seat 210 via a swing action of the second end of the third swing arm 430.

To ensure relative rotation between the first housing seat 210 and the first screen support plate 310, a rotation axis of the first end of the first swing arm 410 is spaced apart from a rotation axis of the first end of the third swing arm 430, so that relative rotation can occur between the second end of the first swing arm 410 and the second end of the third swing arm 430 as the first swing arm 410 and the third swing arm 430 rotate relative to the base 100, enabling the first screen support plate 310 to rotate relative to the first housing seat 210. Specifically, the rotation axis of the first end of the first swing arm 410 and the rotation axis of the first end of the third swing arm 430 are parallel to each other, thereby improving stability of the first swing arm 410 and the third swing arm 430 in the rotation process.

A first end of the second swing arm 420 is rotatably connected to the base 100, so that the second swing arm 420 can rotate around the base 100 via the first end of the second swing arm 420. A second end of the second swing arm 420 is rotatably connected to the second housing seat 220, so that the second swing arm 420 can rotate relative to the second housing seat 220 via the second end of the second swing arm 420. Specifically, similar to the first swing arm 410, rotational connection relationships may be respectively formed between the two opposite ends of the second swing arm 420 and the base 100 and the second housing seat 220 via a pin shaft structure, or rotational fitting relationships may be respectively formed between the two opposite ends of the second swing arm 420 and the base 100 and the second housing seat 220 via another corresponding arc-shaped fitting structure that is correspondingly disposed.

A first end of the fourth swing arm 440 is rotatably connected to the base 100, so that the fourth swing arm 440 can rotate around the base 100 via the first end of the fourth swing arm 440. A second end of the fourth swing arm 440 is slidably fitted into the second housing seat 220, so that there is a relative sliding capability between the second end of the fourth swing arm 440 and the second housing seat 220 in a rotation process of the fourth swing arm 440. Correspondingly, the second end of the fourth swing arm 440 and the second screen support plate 320 can slide relatively and are rotatably fitted, so that when the fourth swing arm 440 is assembled and connected to the second screen support plate 320, the second screen support plate 320 is driven to rotate relative to the second housing seat 220 via a swing action of the second end of the fourth swing arm 440.

Similarly, to ensure relative rotation between the second housing seat 220 and the second screen support plate 320, a rotation axis of the first end of the second swing arm 420 is spaced apart from a rotation axis of the first end of the fourth swing arm 440, so that relative rotation can occur between the second end of the second swing arm 420 and the second end of the fourth swing arm 440 as the second swing arm 420 and the fourth swing arm 440 rotate relative to the base 100, enabling the second screen support plate 320 to rotate relative to the second housing seat 220. Specifically, the rotation axis of the first end of the second swing arm 420 and the rotation axis of the first end of the fourth swing arm 440 are parallel to each other, thereby improving stability of the second swing arm 420 and the fourth swing arm 440 in the rotation process.

Based on the foregoing structure, components in the folding mechanism can move relative to each other under an external force, so that the folding mechanism has an expanded state and a folded state, where the external force may be a force exerted on the electronic device by the user, or the external force may be a driving force provided by a component such as a drive motor built in the electronic device. This is not limited in this specification.

When the folding mechanism is in the expanded state, respective screen support surfaces of the first screen support plate 310, the second screen support plate 320, and the third screen support plate 330 are coplanar, and there is a first spacing between a part that is of the base 100 and that faces the third screen support plate 330 and the third screen support plate 330 in the support direction. When the folding mechanism is in the folded state, there is a second spacing between the part that is of the base 100 and that faces the third screen support plate 330 and the third screen support plate 330 in the support direction, and the second spacing is less than the first spacing.

In other words, in a process in which the folding mechanism switches from the expanded state to the folded state, the third screen support plate 330 moves a preset distance toward the base 100, to provide more accommodating space for the flexible screen that is fitted into the folding mechanism. On the contrary, in a process of switching to the expanded state, the third screen support plate 330 moves a preset distance away from the base 100, so that the third screen support plate 330 provides a good support effect for the flexible screen that is fitted into the folding mechanism.

In addition, based on the connection relationship between the first housing seat 210 and the first screen support plate 310 and the assembly relationship between the first swing arm 410 and the third swing arm 430 above, in a case that the folding mechanism is in the expanded state, respective first side edges of the first screen support plate 310 and the second screen support plate 320 are located between respective second side edges, that is, an outer side of the first screen support plate 310 and the second screen support plate 320 is a second side, and an inside side is a first side edge. Correspondingly, the third screen support plate 330 is located between the first screen support plate 310 and the second screen support plate 320, and the three jointly form a screen support surface of the folding mechanism, to provide a support function for the flexible screen that is fitted into the folding mechanism.

When the folding mechanism is in the folded state, based on a connection relationship between components in the folding mechanism, the first screen support plate 310 can not only rotate with the first housing seat 210 relative to the base 100, but the first screen support plate 310 can also rotate relative to the first housing seat 210, so that the first screen support plate 310 and the second screen support plate 320 form a flaring structural member, and a flaring faces the base 100. In this case, a spacing between respective first sides of the first screen support plate 310 and the second screen support plate 320 is greater than a spacing between respective second sides of the first screen support plate 310 and the second screen support plate 320. This can further expand the accommodating space in which the folded part of the flexible screen is located, and through avoidance space provided by the third screen support plate 330 close to the base 100, maximize the accommodation space of the folded part of the flexible screen when being folded.

In addition, the foregoing electronic device is further provided with a cover 450, the cover 450 is mounted on the base 100, and the cover 450 is disposed on one side that is of the base 100 and that faces away from the third screen support plate 330. In addition, in a case that the folding mechanism is in the expanded state, the cover 450 covers the first end of the first swing arm 410, so that the cover 450 can provide at least a protection and shielding function for the first swing arm 410.

Specifically, the cover 450 may be made of a corrosion-resistant material with specified structural strength such as metal or plastic, and a shape and a size of the cover 450 may be correspondingly selected based on a shape and a size of the first swing arm 410. The cover 450 may be movably connected to the base 100 via a component such as a pin shaft, or the cover 450 may be fastened to the base 100 through welding or via a connecting piece, or the like.

The embodiments of this application provide a folding mechanism and an electronic device. As described above, the folding mechanism includes a base 100, a first housing seat 210, a second housing seat 220, a first screen support plate 310, a second screen support plate 320, a third screen support plate 330, and a swing arm assembly. The first housing seat 210 is rotatably connected to the base 100 via a first swing arm 410, the second housing seat 220 is rotatably connected to the base 100 via a second swing arm 420, the first screen support plate 310 is slidably and rotatably connected to the base 100 via a third swing arm 430, the second screen support plate 320 is slidably and rotatably connected to the base 100 via a fourth swing arm 440, and a rotation axis of the first swing arm 410 is spaced apart from that of the third swing arm 430, and a rotation axis of the second swing arm 420 is spaced apart from that of the fourth swing arm 440, so that when the folding mechanism switches to a folded state, the first screen support plate 310 and the second screen support plate 320 can form a flaring structure with a flaring toward the base, thereby providing more accommodating space for a folded part of a flexible screen that is fitted into the folding mechanism. In addition, the third screen support plate 330 is movably connected to the base 100 in a support direction, so that when the folding mechanism switches to a folded state, the third screen support plate 330 can provide avoidance space for the flexible screen, to further expand the accommodating space in which the folded part of the flexible screen is located, thereby preventing an excessive bending phenomenon of a bending part of the flexible screen due to squeezing, and improving a service life of the flexible screen.

In addition, a cover 450 is further disposed in the foregoing folding mechanism, and the cover 450 is disposed on one side that is of the base 100 that faces away from the third screen support plate 330, and the cover 450 is mounted on the base 100. In a case that the folding mechanism is in an expanded state, the cover 450 can cover a first end of the first swing arm 410. In this case, a shielding protection function may be provided for the first end of the first swing arm 410, and impurities are prevented from entering the first end of the first swing arm 410, to improve working reliability and stability of the first swing arm 410, and provide a specific dustproof and waterproof function for the first swing arm 410, thereby improving a service life of the first swing arm 410.

Further, in a case that the folding mechanism is in an expanded state, the cover 450 and the first swing arm 410 may be in limit fitting, and the first end of the first swing arm 410 is restricted to rotate toward the third screen support plate 330. In other words, in a process in which the folding mechanism switches from the folded state to the expanded state, the cover 450 and the first swing arm 410 are in limit fitting, so that the folding mechanism can be prevented from being expanded excessively due to excessive rotation of the first swing arm 410, thereby ensuring that the flexible screen is not damaged due to overstretching, improving a service life of the flexible screen, and improving security of the electronic device using the foregoing folding mechanism.

Specifically, based on a correspondence between parameters such as a rotation location of the first swing arm 410 and an expansion degree of the flexible screen, a specific structure and a mounting location of the cover 450 may be determined, so that the cover 450 can provide a limiting function for the first swing arm 410 after being mounted on the base 100. More specifically, the cover 450 and the base 100 may be mutually fastened, to improve stability of the limiting function that can be provided by the cover 450.

Further, a size of the cover 450 is increased or a disposing manner of the cover 450 is changed, so that the cover 450 can cover respective first ends of the first swing arm 410 and the second swing arm 420 in a case that the folding mechanism is in the expanded state, and both the first swing arm 410 and the second swing arm 420 are in limit fitting with the cover 450. Therefore, the first end of the first swing arm 410 and the first end of the second swing arm 420 are restricted to rotate toward the third screen support plate 330 via the cover 450. In a case that this technical solution is used, through synchronization restriction on the first swing arm 410 and the second swing arm 420, it can be basically ensured that the folding mechanism does not rotate further when the flexible screen rotates to the expanded state, thereby further ensuring that the folding structure is not expanded excessively, improving protection against the flexible screen, and further improving a service life of the flexible screen.

As described above, the cover 450 is connected to the base 100 in a plurality of manners. Optionally, the cover 450 is provided with a perforation 451, and the first end of the first swing arm 410 is provided with an avoidance notch 411. A threaded hole is disposed on the base 100, so that the cover 450 and the base 100 can be assembled via a threaded connecting piece. In detail, the cover 450 may be detachably fixedly connected to the base 100 via a threaded connecting piece passing through the perforation 451, to further facilitate subsequent maintenance of the folding mechanism. In a process of mounting the threaded connecting piece, the avoidance notch 411 on the first swing arm 410 may provide an avoidance function for the threaded connecting piece. On the one hand, it is ensured that the threaded connecting piece is mounted normally, and on the other hand, normal rotation of the first swing arm 410 prevented from being affected by interference between the first swing arm 410 and the threaded connecting piece.

Certainly, in a case that the cover 450 can also cover the second swing arm 420, the threaded connecting piece may be assembled between the first swing arm 410 and the second swing arm 420, thereby improving connection reliability between the cover 450 and the base 100, and ensuring a stable limit relationship between the first swing arm 410 and the second swing arm 420 and the cover 450. In this case, the second swing arm 420 may also be provided with an avoidance notch.

As described above, the second end of the third swing arm 430 can slide relative to the first housing seat 210. To improve fitting reliability between the two, in an optional embodiment, the first housing seat 210 is provided with a sliding slot 211, and the second end of the third swing arm 430 is slidably fitted into the sliding slot 211, to improve fitting stability between the third swing arm 430 and the first housing seat 210 via the sliding slot 211. Certainly, in another embodiment of this application, the third swing arm 430 and the first housing seat 210 may alternatively form a sliding fitting relationship via a shaft hole structure.

Further, an inner wall of the sliding slot 211 is provided with an avoidance hole 212. A rail body 510 is fastened to the first screen support plate 310, and a sliding member 520 is disposed on the second end of the third swing arm 430, so that the rail body 510 passes through the avoidance hole 212 and at least partially extends into the sliding slot 211, and the sliding member 520 and the rail body 510 can slide relatively and are rotatably fitted. Through the foregoing simple structure, the second end of the third swing arm 430 and the first screen support plate 310 may form an assembly requirement in which relative sliding and rotatable fitting can be performed, thereby reducing processing and assembly difficulty. Specifically, the rail body 510 is a curve structure, and a specific parameter of a structure that is fitted into the sliding member 520 in the rail body 510 may be determined based on a motion track formed in a rotation process of the sliding member 520 with the third swing arm 430, so that the sliding member 520 can slide in the rail body 510 in the rotation process of the third swing arm 430. The foregoing structure can make full use of an existing structure of the sliding slot 211, and complete assembly between components by opening the avoidance hole 212 on a bottom wall of the sliding slot 211, thereby making the overall structure more compact.

Similarly, the second housing seat 220 may also be provided with a sliding slot 211 having a similar structure or the same structure as that of the first housing seat 210, and the second end of the fourth swing arm 440 is slidably fitted into the sliding slot 211 on the second housing seat 220, to improve stability of a sliding fitting relationship between the second housing seat 220 and the fourth swing arm 440.

Further, an inner wall of the sliding slot 211 of the second housing seat 220 may also be provided with an avoidance hole 212 that has a similar structure or a same structure as that of the first housing seat 210. The rail body 510 is fastened to the second screen support plate 320, and the sliding member 520 is disposed on the second end of the fourth swing arm 440, so that the rail body 510 of the second screen support plate 320 passes through the avoidance hole 212 on the second housing seat 220 and at least partially extends into the corresponding sliding slot 211, thereby ensuring that the sliding member 520 of the second housing seat 220 can stably form an assembly relationship in which relative sliding and rotatable fitting can be performed with the rail body 510 on the second screen support plate 320.

More specifically, in the entire folding mechanism, a structure of a part on the first side of the base 100 and a structure of a part on the second side of the base 100 may be symmetrically disposed. For example, the first screen support plate 310 and the second screen support plate 320 are symmetrically disposed, the first housing seat 210 and the second housing seat 220 are symmetrically disposed, the first swing arm 410 and the second swing arm 420 are symmetrically disposed, and the third swing arm 430 and the fourth swing arm 440 are symmetrically disposed. In a case that the foregoing technical solution is used, processing and assembling difficulty can be reduced, and symmetry of the folding mechanism can be improved, thereby improving structural reliability and stability of the folding mechanism and improving user experience of the electronic device using the folding mechanism. For ease of description later, the following describes in detail a specific structure of each component in the folding mechanism and a connection relationship between components by using an example in which structures on the two opposite sides of the base 100 are symmetrical, and a structure on the first side of the base 100 is used.

Optionally, the sliding member 520 may be specifically a long rod-shaped structural member. In a process of assembling the third swing arm 430 and the first screen support plate 310, the sliding member 520 and the third swing arm 430 that are disposed separately may be pre-disposed, and the sliding member 520 is first mounted on the rail body 510 on the first screen support plate 310 and then the sliding member 520 and the third swing arm 430 are fastened as a whole through welding or the like, so that the third swing arm 430 and the first screen support plate 310 can form a connection relationship in which relative sliding and rotatable fitting can be performed.

As described above, rotational fitting relationships may be formed between the first swing arm 410 and the base 100 and between the second swing arm 420 and the base 100 via a rotational connection mechanism such as a shaft hole fitting structure. In a specific embodiment of this application, respective first ends of the first swing arm 410 and the second swing arm 420 are provided with a first rotating portion and a second rotating portion that are axially distributed along rotation of the first swing arm 410, and the two opposite sides of the base 100 are provided with a third rotating portion 110 and a fourth rotating portion 120. Each first rotating portion is rotatably fitted into the corresponding third rotating portion 110, and each second rotating portion is rotatably fitted into the corresponding fourth rotating portion 120. In a case that the first swing arm 410 (and the second swing arm 420) and the base 100 form a rotational connection relationship, through a joint action of the first rotating portion and the second rotating portion reliability and stability of the rotational connection relationship between the first swing arm 410 (and the second swing arm 420) and the base can be improved.

In addition, locations and structures of the first rotating portion and the second rotating portion are designed, so that it can be ensured that both the first swing arm 410 and the second swing arm 420 are in limit fitting with and the base 100 in a direction perpendicular to an extension direction of the base 100, thereby further improving fitting stability and structural reliability between the first swing arm 410 and the second swing arm 420 and the base 100.

Specifically, the structures of the first rotating portion and the second rotating portion may be the same, to reduce processing difficulty of the first swing arm 410 and the second swing arm 420. The first rotating portion may be a cylindrical structural member provided with a shaft hole or a piercing shaft, and correspondingly, the third rotating portion 110 may be a cylindrical structural member provided with a piercing shaft or a shaft hole. In addition, the piercing shaft may be configured with an indent capability via an elastic member, so that in a process of assembling the first rotating portion and the third rotating portion 110, the piercing shaft can be inserted into the corresponding shaft hole, and when the first rotating portion is rotatably connected to the third rotating portion 110, a limit fitting relationship is formed between the two and the base 100 in a direction perpendicular to the extension direction of the base 100. In addition, in the first swing arm 410 (and/or the second swing arm 420), a spacing may be set between the first rotating portion and the second rotating portion, or the first rotating portion and the second rotating portion may be disposed adjacent to each other. This is not limited herein.

In another embodiment of this application, optionally, an arc-shaped fitting member may be disposed in each of the first rotating portion, the second rotating portion, the third rotating portion 110, and the fourth rotating portion 120. More specifically, the first rotating portion and the third rotating portion 110 are provided with corresponding arc-shaped fitting planes, so that a rotational fitting relationship can be formed between the two. Correspondingly, the second rotating portion and the fourth rotating portion 120 are provided with corresponding arc-shaped fitting planes, so that a rotational fitting relationship can also be formed between the second rotating portion and the fourth rotating portion 120. Certainly, structures of the arc-shaped fitting planes on the first rotating portion and the second rotating portion may be the same or different. This is not limited herein.

In addition, to ensure that the first housing seat 210 and the base 100 are rotatably connected to each other via the first rotating portion and the third rotating portion 110 and the second rotating portion and the fourth rotating portion 120, and a limit relationship can be formed between the first swing arm 410 (and the second swing arm 420) and the base 100 in the direction perpendicular to the extension direction of the base 100, an arc-shaped fitting plane of the first rotating portion is disposed opposite to an arc-shaped fitting plane of the second rotating portion. Specifically, if an arc surface of the arc-shaped fitting plane of the first rotating portion faces upward, an arc surface of the arc-shaped fitting plane of the second rotating portion may face downward. In a case that the foregoing technical solution is used, the third rotating portion 110 is fitted into the first rotating portion, and the fourth rotating portion 120 is fitted into the second rotating portion, so that it can be ensured that the first swing arm 410 (and the second swing arm 420) and the base 100 limit each other in the direction perpendicular to the extension direction of the base 100.

Correspondingly, in a case that the foregoing technical solution is used for the first rotating portion and the second rotating portion on the first swing arm 410, the first rotating portion and the second rotating portion on the second swing arm 420 may also be disposed with reference to the foregoing technical solution. Certainly, sizes and location relationships of the first rotating portion and the second rotating portion that are disposed on the second swing arm 420 may be the same as or may be different from sizes and location relationships of the first rotating portion and the second rotating portion that are disposed on the first swing arm 410.

To further improve stability of the fitting relationship between the first swing arm 410 and the second swing arm 420 and the base 100, optionally, at least one of the first swing arm 410 or the second swing arm 420 is provided with two second rotating portions, and there is at least one first rotating portion in the two second rotating portions. Because the first rotating portion and the second rotating portion are opposite to each other in a limiting direction of the first swing arm 410, in a case that the second rotating portion is disposed on the two opposite sides of the first rotating portion by using the foregoing technical solution, mutual inclination between the first swing arm 410 and the base 100 can be further prevented, thereby improving fitting stability between the first swing arm 410 and the base 100. Both the first swing arm 410 and the second swing arm 420 may use the foregoing technical solution, to ensure better stability of the entire folding mechanism.

Still further, taking the first swing arm 410 as an example, in the first swing arm 410, the first rotating portion is provided with a fitting slot, the second rotating portion is provided with a fitting bump, and both the fitting slot and the fitting bump are provided with arc-shaped fitting planes. Correspondingly, the fitting slot and the fitting bump with the arc-shaped fitting planes may be formed on the base 100 through etching, drilling, or the like, so that the fitting slot and the fitting bump formed on the base 100 are used as at least a part of the third rotating portion 110 and the fourth rotating portion 120, to be respectively fitted into the first rotating portion and the second rotating portion, so that when the first swing arm 410 and the base 100 are rotatably fitted, the two can limit each other in the direction perpendicular to the extension direction of the base 100.

In a case that the foregoing structure is used, to ensure that a fitting relationship can be normally formed between the first swing arm 410 and the base 100, each fitting slot needs to have an opening, so that a corresponding structure in the first swing arm 410 extends into the fitting slot from the opening of the fitting slot on the base 100. In addition, a corresponding structure in the base 100 may also extend into the fitting slot via the opening of the fitting slot on the first swing arm 410, to implement a rotation connection between the first swing arm 410 and the base 100.

Optionally, a location relationship between the fitting bump and the opening of the fitting slot may be adaptively adjusted. In the first swing arm 410, the fitting bump may be disposed on one side that is of the fitting slot and that faces away from the opening of the fitting slot, and in the base 100, the fitting bump may be disposed on one side that faces the opening of the fitting slot. Through the foregoing technical solution, space occupied by the third rotating portion 110 and the fourth rotating portion 120 in the base 100 is greatly reduced, and difficulty and workload in forming the third rotating portion 110 and the fourth rotating portion 120 may be further reduced to an extent.

Optionally, the folding mechanism provided in this embodiment of this application may further include a first connecting shaft 610 and a second connecting shaft 620, and both the first connecting shaft 610 and the second connecting shaft 620 are rotatably mounted on the base 100. Specifically, a structure such as a mounting groove for mounting the first connecting shaft 610 and the second connecting shaft 620 may be disposed on the base 100, and the first connecting shaft 610 and the second connecting shaft 620 are rotatably mounted in the mounting groove, so that both the first connecting shaft 610 and the second connecting shaft 620 can rotate with the base 100. In addition, the first connecting shaft 610 is spaced apart from the second connecting shaft 620, to prevent mutual interference in a rotation process of the two.

In addition, the third swing arm 430 and the first connecting shaft 610 are in limit fitting in a rotation direction of the first swing arm 410, and the fourth swing arm 440 and the second connecting shaft 620 are in limit fitting in the above rotation direction, so that when the third swing arm 430 rotates, the first connecting shaft 610 can be driven to rotate, and when the fourth swing arm 440 rotates, the second connecting shaft 620 can be driven to rotate. Specifically, the third swing arm 430 may be sleeved on the first connecting shaft 610, and the fourth swing arm 440 may be sleeved on the second connecting shaft 620. In addition, the foregoing two groups of components correspondingly form an interference fit relationship, so that the third swing arm 430 and the first connecting shaft 610 synchronously rotate, and the fourth swing arm 440 and the second connecting shaft 620 synchronously rotate. In another embodiment of this application, a limit fitting relationship may be formed between the third swing arm 430 and the first connecting shaft 610 in a key join manner, and correspondingly, a limit fitting relationship may be formed between the fourth swing arm 440 and the second connecting shaft 620 in a key join manner, to further improve stability of the limit fitting relationship.

Based on the foregoing technical content, further, the first connecting shaft 610 and the second connecting shaft 620 are connected via a gear synchronization mechanism. The gear synchronization mechanism may include two gears, and the two gears are engaged with each other and are respectively connected to the first connecting shaft 610 and the second connecting shaft 620, so that a transmission connection relationship can be formed between the first connecting shaft 610 and the second connecting shaft 620. In addition, based on a connection relationship between the first connecting shaft 610 and the first housing seat 210 and a connection relationship between the second connecting shaft 620 and the second housing seat 220, the first housing seat 210 and the second housing seat 220 can also synchronously rotate via the gear synchronization mechanism.

In a case that the foregoing technical solution is used, it can be ensured that the first screen support plate 310 and the second screen support plate 320 have a synchronous rotation capability. Therefore, regardless of which of the foregoing two is driven, the other may be driven to rotate relative to the base 100 via the gear synchronization mechanism or the like, so that rotation angles of the first screen support plate 310 and the second screen support plate 320 relative to the base 100 are always the same, thereby improving comprehensive performance of the entire folding mechanism.

In another embodiment of this application, optionally, the gear synchronization mechanism includes a first gear 631, a second gear 632, a first engaging tooth 633 disposed on the first connecting shaft 610, and a second engaging tooth 634 disposed on the second connecting shaft 620, where the first engaging tooth 633 is engaged with the first gear 631, the first gear 631 is engaged with the second gear 632, and the second gear 632 is engaged with the second engaging tooth 634. Through the foregoing technical solution, a diameter of each component in the gear synchronization mechanism may be small, to minimize space occupied by the gear synchronization mechanism in the folding mechanism, thereby finally improving internal space utilization of the electronic device.

Specifically, the first connecting shaft 610 and the first engaging tooth 633 may form a gear shaft, and correspondingly, the second connecting shaft 620 and the second engaging tooth 634 may also form a gear shaft. In addition, because rotation angles of the first housing seat 210 and the second housing seat 220 relative the base 100 are generally not greater than 90°, the first engaging tooth 633 may cover a quarter to a half of a circle on the first connecting shaft 610, and correspondingly, the second engaging tooth 634 may cover a quarter to a half of a circle on the second connecting shaft 620. This basically ensures that the first engaging tooth 633 and the second engaging tooth 634 can provide reliable synchronization, and can reduce production costs. Certainly, to maximize reliability of the gear synchronization mechanism, the first engaging tooth 633 may be completely covered in a circumferential direction of the first connecting shaft 610, or the second engaging tooth 634 may be completely covered in a circumferential direction of the second connecting shaft 620.

More specifically, a mounting shaft may be disposed on the base, and both the first gear 631 and the second gear 632 are sleeved on the corresponding mounting shaft, to ensure that locations of the first gear 631 and the second gear 632 do not change when the folding mechanism works, thereby providing a stable and reliable transmission function. Alternatively, a gear bracket 640 may be disposed in the gear synchronization mechanism, a gear shaft may be disposed in the gear bracket 640, and the gear bracket 640 may be mounted on the base 100 via a connecting piece such as a screw or the like, thereby reducing processing difficulty of the base 100. Certainly, a shaft hole may also be disposed in the gear bracket 640. In this case, both the first gear 631 and the second gear 632 may be gears with shafts, that is, the two each have a gear shaft. The gear shaft of each of the first gear 631 and the second gear 632 is mounted in the shaft hole of the gear bracket 640, so that a stable assemble relationship can be formed between the first gear 631 and the second gear 632 and the base 100.

In a specific embodiment of this application, the folding mechanism may further include a first cam sleeve 651, a second cam sleeve 652, and an elastic member 660. The first cam sleeve 651 and the second cam sleeve 652 are sleeved on the first connecting shaft 610, and the first cam sleeve 651 is fastened to the third swing arm 430. The second cam sleeve 652 is rotatably fitted into the first connecting shaft 610 in the rotation direction of the first swing arm 410. In a case that the first cam sleeve 651 and the second cam sleeve 652 rotate relative to each other, the elastic member 660 is in a stretched state or a contracted state.

Specifically, specific structures of the first cam sleeve 651 and the second cam sleeve 652 may be the same, and the two are buckled. In a process in which the first cam sleeve 651 and the second cam sleeve 652 rotate relative to each other, a maximum spacing between the first cam sleeve 651 and the second cam sleeve 652 is greater than an initial spacing (that is, a minimum spacing) between the two. In this case, the elastic member 660 is stretched or compressed, so that the elastic member 660 can exert an elastic reset force on the first cam sleeve 651 and/or the second cam sleeve 652, and the first cam sleeve 651 and the second cam sleeve 652 return to the buckled state, that is, a state of the minimum spacing between the two.

Through the foregoing technical solution, a relative location between the first cam sleeve 651 and the second cam sleeve 652 in the buckled state may be designed, so that when the folding mechanism is in the folded state and the expanded state, both the first cam sleeve 651 and the second cam sleeve 652 are in the buckled state. Therefore, in a case that the folding mechanism is in an unfolded state and a non-expanded state, relative rotation occurs between the first cam sleeve 651 and the second cam sleeve 652, thereby increasing the spacing between the first cam sleeve 651 and the second cam sleeve 652, so that the elastic member 660 is stretched or compressed. Therefore, through the foregoing technical solution, the folding mechanism may be easily maintained in the expanded state and in the folded state via the elastic member 660, and the expanded state or the folded state of the folding mechanism is prevented from being damaged due to a relatively small external force, which causes inconvenience to use of the user.

Optionally, the folding mechanism further includes a mounting member 673, and the mounting member 673 is fastened to the base 100. Specifically, the mounting member 673 may be fastened to the base 100 through welding or via a connecting piece or the like. The mounting member 673 is provided with a first limiting member 671 and a second limiting member 672 that are axially opposite and fixed along a rotation direction of the second rotating portion, the first cam sleeve 651, the second cam sleeve 652, and the elastic member 660 are disposed between the first limiting member 671 and the second limiting member 672, and the elastic member 660 is disposed on one side that is of the second cam sleeve 652 and that faces away from the first cam sleeve 651. In a case that the foregoing technical solution is used, the first limiting member 671 and the second limiting member 672 may provide a positioning base, so that reliability of the elastic member 660 can be improved, and mounting difficulty of the elastic member 660 can be reduced.

In a case that the foregoing technical solution is used, relative rotation occurs between the first cam sleeve 651 and the second cam sleeve 652, that is, the elastic member 660 is compressed, so that the elastic member 660 exerts an elastic force on the first cam sleeve 651 and the second cam sleeve 652 to enable the two to reset. To further resolve a problem that it is difficult to maintain the folding mechanism in the folded state and in the expanded state, the elastic member 660 may have a pre-tightening force, so that the elastic member 660 is in a compressed state when the first cam sleeve 651 and the second cam sleeve 652 are buckled.

Specifically, the first cam sleeve 651 and the third swing arm 430 may be connected to each other through welding, integrated molding, or the like, and a limit fitting relationship may be formed between the third swing arm 430 and the first connecting shaft 610 in the rotation direction of the second rotating portion via the first cam sleeve 651. More specifically, the first cam sleeve 651 and the first connecting shaft 610 may be connected to each other in a key join manner, and an inner peripheral surface of the second cam sleeve 652 may be a circular structure, so that the second cam sleeve 652 can normally rotate relative to the first connecting shaft 610. Certainly, in a process in which the first connecting shaft 610 rotates with the third swing arm 430, to prevent the second cam sleeve 652 from being rotated with the first cam sleeve 651 and the first connecting shaft 610, the second cam sleeve 652 and the base 100 may be limit fitting in the rotation direction of the second rotating portion.

In addition, the first limiting member 671, the second limiting member 672, and the mounting member 673 may be formed through integrated molding, to improve stability of a connection relationship among the three. Fitting holes may be disposed on the first limiting member 671 and the second limiting member 672, and the two opposite ends of the first connecting shaft 610 and the second connecting shaft 620 are respectively fitted into the first limiting member 671 and the second limiting member 672. More specifically, both the fitting holes may be through holes, and both the first connecting shaft 610 and the second connecting shaft 620 pass beyond the first limiting member 671 and the second limiting member 672. Then, both the first connecting shaft 610 and the second connecting shaft 620 may form a stable rotational fitting relationship with the mounting member 673 via a structure such as a clamp spring 674. In addition, the first gear 631 and the second gear 632 may also be rotatably mounted on the first limiting member 671 or the second limiting member 672 via a component such as a gear shaft, so that the first gear 631 and the second gear 632 can be stably rotatably fitted into the first engaging tooth 633 and the second engaging tooth 634. In addition, in a case that the foregoing technical solution is used, the gear bracket 640 described above may be disposed, or the gear bracket 640 may no longer be disposed. This is not limited herein.

Optionally, both the third swing arm 430 and the fourth swing arm 440 are fastened to the first cam sleeves 651, and each first cam sleeve 651 is provided with the second cam sleeve 652 and the elastic member 660. In other words, in a case that the folding mechanism is in the expanded state and in the folded state, both one side on which the third swing arm 430 is located and one side on which the fourth swing arm 440 is located may be subject to an elastic action of the elastic member 660, and the elastic force can prevent the folding mechanism from leaving the expanded state and the folded state, thereby improving a capability of stably maintaining the folding mechanism in the expanded state and in the folded state. Certainly, in both the third swing arm 430 and the fourth swing arm 440, a plurality of groups of first cam sleeves 651, second cam sleeves 652, and elastic members 660 that are fitted into each other may be disposed, to further improve the capability of maintaining the folding mechanism in the folded state and the expanded state.

As described above, a limit relationship meeting a requirement may be formed between components such as the second cam sleeve 652 and the base 100, so that a case that axial movement cannot be produced between the first cam sleeve 651 and the second cam sleeve 652 because the second cam sleeve 652 rotates with the first cam sleeve 651 when the first cam sleeve 651 rotates can be avoided. In the foregoing case, in a case that both the third swing arm 430 and the fourth swing arm 440 are provided with the first cam sleeves 651, a connecting rod 653 may be disposed between the second cam sleeves 652 that are respectively fitted into the foregoing two first cam sleeves 651 in a one-to-one correspondence. In this case, on the one hand, the second cam sleeves 652 may be respectively mounted on the first connecting shaft 610 and the second connecting shaft 620, thereby reducing assembling difficulty. On the other hand, the two second cam sleeves 652 may further have a synchronizing action capability, thereby further improving a capability of maintaining the folding mechanism in the folded state and in the expanded state. In addition, the two second cam sleeves 652 are connected to each other via the connecting rod 653, so that in a process of designing and assembling the second cam sleeves 652, it is unnecessary to configure a limiting structure for the second cam sleeves 652 respectively. Under a joint action of the connecting rod 653 and the two second cam sleeves 652, the second cam sleeves 652 can rotate respectively relative to the first connecting shaft 610 and the second rotation shaft, thereby basically ensuring that the second cam sleeve 652 does not rotate with rotation of the first cam sleeve 651.

To improve reliability of the connection relationship between the first housing seat 210 (and the second housing seat 220) and the base 100, there may be a plurality of swing arm assemblies, and the plurality of swing arm assemblies are distributed along an axial direction of the first swing arm 410. To prevent interference between the swing arm assemblies as far as possible, any two adjacent swing arm assemblies may be disposed apart along the rotational axial direction. Specifically, there may be two, three, or more swing arm assemblies, and the plurality of swing arm assemblies may include two symmetrically disposed swing arm assemblies, to ensure that the entire folding mechanism has reliable folding performance.

As described above, specific structures of corresponding components in the folding mechanism may be symmetrically disposed. Further, in the assembled folding mechanism, the first swing arm 410 may be opposite to the second swing arm 420, and the third swing arm 430 may be opposite to the fourth swing arm 440. Specifically, in a case that the structures of the first swing arm 410 and the second swing arm 420 are symmetrical to each other, the third rotating portion 110 and the fourth rotating portion 120 that are disposed on the two opposite sides of the base 100 and that are respectively fitted into the first swing arm 410 and the second swing arm 420 are also correspondingly disposed, so that the first swing arm 410 and the second swing arm 420 can be mounted on the base 100 opposite to each other. Correspondingly, for a process of assembling the third swing arm 430 and the fourth swing arm 440, refer to the designing and mounting of the first swing arm 410 and the second swing arm 420. Through the foregoing technical solution, symmetry of the folding mechanism can be greatly improved, and folding and expansion performance of the folding mechanism can be improved. In addition, synchronization between the first screen support plate 310 and the second screen support plate 320 can be improved, and a supporting effect for the flexible display screen can be improved.

As described above, the third screen support plate 330 can move relative to the base 100. Optionally, the base 100 is provided with an accommodating groove 130 recessed along the support direction, and the third screen support plate 330 is movably mounted in the accommodating groove 130. In a case that the foregoing technical solution is used, when the folding mechanism is in the expanded state, the third screen support plate 330 may be located in the accommodating groove 130 of the base 100, and a screen support surface of the third screen support plate 330 is flush with a surface that is of the base 100 and that faces the flexible screen, to jointly provide a support function for the flexible screen. When the folding mechanism is in the folded state and the third screen support plate 330 moves toward a part (that is, the accommodating groove 130 above) that is of the base 100 and that faces the third screen support plate 330, the third screen support plate 330 may be accommodated in the accommodating groove 130. Apparently, through the foregoing technical solution, a maximum size and a minimum size of a combined structure of the third screen support plate 330 and the base 100 are not greatly different, so that space waste in the electronic device is minimized. Certainly, in a case that requirements are different, when the folding mechanism is in the expanded state, the third screen support plate 330 may also protrude from the accommodating groove 130 and support the flexible screen. This is not limited in this specification.

Further, the base 100 may be provided with a through hole, a threaded connecting piece 350 is penetrated in the through hole, and the threaded connecting piece 350 is fixedly connected to the third screen support plate 330. Specifically, a screw seat may be disposed on the third screen support plate 330, so that a fixed connection relationship can be formed between the threaded connecting piece 350 and the third screen support plate 330. In addition, a screw cap of the threaded connecting piece 350 is located on one side that is of the base 100 and that faces away from the third screen support plate 330, and the screw cap and the through hole are in limit fitting in an axial direction of the through hole. This can ensure that a motion range between the third screen support plate 330 and the base 100 is limited within a length range of the threaded connecting piece 350, and the third screen support plate 330 and the base 100 can be prevented from being separated from each other.

In addition, the third screen support plate 330 may be further provided with a specified guiding and limiting function under an action of the threaded connecting piece 350. To further improve stability of the fitting relationship between the third screen support plate 330 and the base 100, one of the third screen support plate 330 and the base 100 is provided with a guide post 360 and the other is provided with a guide hole 140, and the guide hole 140 is inserted and fitted into the guide post 360 in the support direction of the third screen support plate 330, so that better fitting stability between the third screen support plate 330 and the base 100 can be basically ensured under a joint action of the guide post 360 and the threaded connecting piece 350. A shape of the guide post 360 corresponds to a shape of the guide hole 140, and an end of the guide post 360 may be chamfered, to reduce difficulty of insertion between the guide post 360 and the guide hole 140. The guide post 360 may be formed together with the third screen support plate 330, and the guide hole 140 may be formed on the base 100 through drilling processing or the like. There may be a plurality of guide posts 360 and a plurality of guide holes 140, and the plurality of guide posts 360 are fitted into the plurality of guide holes 140 in a one-to-one correspondence, thereby further improving fitting stability between the third screen support plate 330 and the base 100.

As described above, there may be a plurality of driving sources for the third screen support plate 330 to move relative to the base 100 in the support direction. To ensure that the third screen support plate 330 can provide a reliable support function for the flexible screen, optionally, in a case that the folding mechanism is in the expanded state, the third screen support plate 330 is supported on the first end of the first swing arm 410 and the first end of the second swing arm 420. In other words, in a process of rotating and flattening the first swing arm 410 and the second swing arm 420 relative to the base 100, the first swing arm 410 and the second swing arm 420 can be fitted into the third screen support plate 330 at a specified time point, so that the third screen support plate 330 can move away from a part (for example, the accommodating groove 130 above) that is of the base 100 and that is opposite to the third screen support plate 330 as the first swing arm 410 and the second swing arm 420 continue to flatten, and when the first swing arm 410 and the second swing arm 420 are flattened, the third screen support plate 330 is exactly supported in a corresponding region of the flexible screen.

Based on the foregoing embodiment, further, in a process in which the folding mechanism switches from the expanded state to the folded state, to enable the third screen support plate 330 to return to an in-situ location more easily, the in-situ location is a location in which the third screen support plate 330 is located after moving toward the base 100 by a preset distance. Optionally, the folding mechanism may further include an elastic reset member 340. The elastic reset member 340 may be specifically a spring, a rubber elastic member 660, or the like, and the elastic reset member 340 is connected between the third screen support plate 330 and the base 100. In a case that the folding mechanism is in the expanded state, the elastic reset member 340 is in a stretched state, so that when relative rotation occurs between the first swing arm 410 and the second swing arm 420 in the flattened state, the third screen support plate 330 can move toward the base 100 under an action of the elastic reset member 340.

In a case that the foregoing technical solution is used, interference and squeezing between the flexible screen in a folding process and the third screen support plate 330 may further be avoided, thereby improving a service life of the flexible screen. In addition, in a case that the third screen support plate 330 is provided with the threaded connecting piece 350, the elastic reset member 340 may be sleeved outside the threaded connecting piece 350, thereby providing a limiting function for the elastic reset member 340 and improving elastic performance of the elastic reset member 340.

Based on the folding mechanism provided in any one of the foregoing embodiments, an embodiment of this application further provides an electronic device, including a flexible screen, a first housing, a second housing, and any one of the foregoing folding mechanisms, where the first housing is fixedly connected to the first housing seat 210, the second housing is fixedly connected to the second housing seat 220, and the flexible screen is disposed on the first housing, the second housing, the first screen support plate 310, the second screen support plate 320, and the third screen support plate 330. Certainly, the electronic device may further include a main board, a camera, a microphone, a receiver, and another electronic component. For brevity, details are not described in this specification.

The electronic device disclosed in the embodiments of this application may be a mobile phone, a computer, an e-book reader, a wearable device, or the like. A specific type of the electronic device is not limited in this embodiment of this application.

It should be noted that, in this specification, the terms “include”, “comprise”, or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by “including a . . . ” does not, without more constraints, preclude the presence of additional identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

The embodiments of this application are described above with reference to the accompanying drawings, but this application is not limited to the above specific implementations, and the above specific implementations are only illustrative and not restrictive. Under the enlightenment of this application, those of ordinary skill in the art can make many forms without departing from the purpose of this application and the protection scope of the claims, all of which fall within the protection of this application.

What is claimed is:

1. A folding mechanism, comprising a base, a first housing seat, a second housing seat, a first screen support plate, a second screen support plate, and a third screen support plate, wherein the first housing seat is rotatably disposed on the first screen support plate, the first housing seat and the first screen support plate are disposed on a first side of the base, the second housing seat is rotatably disposed on the second screen support plate, the second housing seat and the second screen support plate are disposed on a second side of the base, the first side and the second side are disposed opposite to each other, and the third screen support plate is movably connected to the base in a support direction of the third screen support plate;

the folding mechanism further comprises a swing arm assembly and a cover, wherein the swing arm assembly comprises a first swing arm, a second swing arm, a third swing arm, and a fourth swing arm, the first swing arm and the third swing arm are disposed on a same side as the first housing seat, and the second swing arm and the fourth swing arm are disposed on a same side as the second housing seat;

a first end of the first swing arm is rotatably connected to the base, a second end of the first swing arm is rotatably connected to the first housing seat, a first end of the third swing arm is rotatably connected to the base, a second end of the third swing arm is slidably fitted into the first housing seat, the second end of the third swing arm and the first screen support plate can slide relatively and are rotatably fitted, and a rotation axis of the first end of the first swing arm is spaced apart from a rotation axis of the first end of the third swing arm;

a first end of the second swing arm is rotatably connected to the base, a second end of the second swing arm is rotatably connected to the second housing seat, a first end of the fourth swing arm is rotatably connected to the base, a second end of the fourth swing arm is slidably fitted into the second housing seat, the second end of the fourth swing arm and the second screen support plate can slide relatively and are rotatably fitted, and a rotation axis of the first end of the second swing arm is spaced apart from a rotation axis of the first end of the fourth swing arm; and the cover is mounted on the base, and the cover is disposed on one side that is of the base and that faces away from the third screen support plate; and the folding mechanism has an expanded state and a folded state, wherein in the expanded state, respective screen support surfaces of the first screen support plate, the second screen support plate, and the third screen support plate are coplanar, there is a first spacing between a part that is of the base and that faces the third screen support plate and the third screen support plate in the support direction, and the cover covers the first end of the first swing arm; and in the folded state, there is a second spacing between the part that is of the base and that faces the third screen support plate and the third screen support plate in the support direction, and the second spacing is less than the first spacing.

2. The folding mechanism according to claim 1, wherein in the expanded state, the cover and the first swing arm are in limit fitting, and the first end of the first swing arm is restricted to rotate toward the third screen support plate.

3. The folding mechanism according to claim 2, wherein in the expanded state, the cover covers the first end of the first swing arm and the first end of the second swing arm, both the first swing arm and the second swing arm and the cover are in limit fitting, and the cover restricts the first end of the first swing arm and the first end of the second swing arm to rotate toward the third screen support plate.

4. The folding mechanism according to claim 1, wherein the cover is provided with a perforation, the first end of the first swing arm is provided with an avoidance notch, the cover is detachably fixedly connected to the base via a threaded connecting piece passing through the perforation, and the avoidance notch is configured to avoid the threaded connecting piece.

5. The folding mechanism according to claim 1, wherein the folding mechanism further comprises a first connecting shaft and a second connecting shaft, and both the first connecting shaft and the second connecting shaft are rotatably mounted on the base; and the third swing arm and the first connecting shaft are in limit fitting in a rotation direction of the first swing arm, the fourth swing arm and the second connecting shaft are in limit fitting in the rotation direction, the first connecting shaft and the second connecting shaft are connected via a gear synchronization mechanism, and the first housing seat and the second housing seat synchronously rotate via the gear synchronization mechanism.

6. The folding mechanism according to claim 1, wherein the base is provided with an accommodating groove recessed along the support direction, and the third screen support plate is movably mounted in the accommodating groove.

7. The folding mechanism according to claim 6, wherein the base is provided with a through hole, a threaded connecting piece is penetrated in the through hole, the threaded connecting piece is fixedly connected to the third screen support plate, a screw cap of the threaded connecting piece is located on one side that is of the base and that faces away from the third screen support plate, and the screw cap and the through hole are in limit fitting in an axial direction of the through hole; and one of the third screen support plate and the base is provided with a guide post and the other is provided with a guide hole, and the guide hole is inserted and fitted into the guide post in the support direction of the third screen support plate.

8. The folding mechanism according to claim 1, wherein in the expanded state, the third screen support plate is supported on the first end of the first swing arm and the first end of the second swing arm.

9. The folding mechanism according to claim 8, wherein the folding mechanism further comprises an elastic reset member, the elastic reset member is connected between the third screen support plate and the base, and in the expanded state, the elastic reset member is in a stretched state.

10. An electronic device, comprising a flexible screen, a first housing, a second housing, and a folding mechanism, wherein the folding mechanism comprises a base, a first housing seat, a second housing seat, a first screen support plate, a second screen support plate, and a third screen support plate, wherein the first housing is fixedly connected to the first housing seat, the second housing is fixedly connected to the second housing seat, and the flexible screen is disposed on the first housing, the second housing, the first screen support plate, the second screen support plate, and the third screen support plate; wherein the first housing seat is rotatably disposed on the first screen support plate, the first housing seat and the first screen support plate are disposed on a first side of the base, the second housing seat is rotatably disposed on the second screen support plate, the second housing seat and the second screen support plate are disposed on a second side of the base, the first side and the second side are disposed opposite to each other, and the third screen support plate is movably connected to the base in a support direction of the third screen support plate;

the folding mechanism further comprises a swing arm assembly and a cover, wherein the swing arm assembly comprises a first swing arm, a second swing arm, a third swing arm, and a fourth swing arm, the first swing arm and the third swing arm are disposed on a same side as the first housing seat, and the second swing arm and the fourth swing arm are disposed on a same side as the second housing seat;

a first end of the first swing arm is rotatably connected to the base, a second end of the first swing arm is rotatably connected to the first housing seat, a first end of the third swing arm is rotatably connected to the base, a second end of the third swing arm is slidably fitted into the first housing seat, the second end of the third swing arm and the first screen support plate can slide relatively and are rotatably fitted, and a rotation axis of the first end of the first swing arm is spaced apart from a rotation axis of the first end of the third swing arm;

a first end of the second swing arm is rotatably connected to the base, a second end of the second swing arm is rotatably connected to the second housing seat, a first end of the fourth swing arm is rotatably connected to the base, a second end of the fourth swing arm is slidably fitted into the second housing seat, the second end of the fourth swing arm and the second screen support plate can slide relatively and are rotatably fitted, and a rotation axis of the first end of the second swing arm is spaced apart from a rotation axis of the first end of the fourth swing arm; and the cover is mounted on the base, and the cover is disposed on one side that is of the base and that faces away from the third screen support plate; and the folding mechanism has an expanded state and a folded state, wherein in the expanded state, respective screen support surfaces of the first screen support plate, the second screen support plate, and the third screen support plate are coplanar, there is a first spacing between a part that is of the base and that faces the third screen support plate and the third screen support plate in the support direction, and the cover covers the first end of the first swing arm; and in the folded state, there is a second spacing between the part that is of the base and that faces the third screen support plate and the third screen support plate in the support direction, and the second spacing is less than the first spacing.

11. The electronic device according to claim 10, wherein in the expanded state, the cover and the first swing arm are in limit fitting, and the first end of the first swing arm is restricted to rotate toward the third screen support plate.

12. The electronic device according to claim 11, wherein in the expanded state, the cover covers the first end of the first swing arm and the first end of the second swing arm, both the first swing arm and the second swing arm and the cover are in limit fitting, and the cover restricts the first end of the first swing arm and the first end of the second swing arm to rotate toward the third screen support plate.

13. The electronic device according to claim 10, wherein the cover is provided with a perforation, the first end of the first swing arm is provided with an avoidance notch, the cover is detachably fixedly connected to the base via a threaded connecting piece passing through the perforation, and the avoidance notch is configured to avoid the threaded connecting piece.

14. The electronic device according to claim 10, wherein the folding mechanism further comprises a first connecting shaft and a second connecting shaft, and both the first connecting shaft and the second connecting shaft are rotatably mounted on the base; and the third swing arm and the first connecting shaft are in limit fitting in a rotation direction of the first swing arm, the fourth swing arm and the second connecting shaft are in limit fitting in the rotation direction, the first connecting shaft and the second connecting shaft are connected via a gear synchronization mechanism, and the first housing seat and the second housing seat synchronously rotate via the gear synchronization mechanism.

15. The electronic device according to claim 10, wherein the base is provided with an accommodating groove recessed along the support direction, and the third screen support plate is movably mounted in the accommodating groove.

16. The electronic device according to claim 15, wherein the base is provided with a through hole, a threaded connecting piece is penetrated in the through hole, the threaded connecting piece is fixedly connected to the third screen support plate, a screw cap of the threaded connecting piece is located on one side that is of the base and that faces away from the third screen support plate, and the screw cap and the through hole are in limit fitting in an axial direction of the through hole; and one of the third screen support plate and the base is provided with a guide post and the other is provided with a guide hole, and the guide hole is inserted and fitted into the guide post in the support direction of the third screen support plate.

17. The electronic device according to claim 10, wherein in the expanded state, the third screen support plate is supported on the first end of the first swing arm and the first end of the second swing arm.

18. The electronic device according to claim 17, wherein the folding mechanism further comprises an elastic reset member, the elastic reset member is connected between the third screen support plate and the base, and in the expanded state, the elastic reset member is in a stretched state.

* * * * *